United States Patent
Koehler, Jr. et al.

(10) Patent No.: US 7,739,728 B1
(45) Date of Patent: Jun. 15, 2010

(54) END-TO-END IP SECURITY (75) Inventors: Edwin Koehler, Jr., Ontario, NY (US);
Sleiman Cherif, East Amherst, NY (US)

(73) Assignee: Avaya Inc., Basking Ridge, NJ (US)

( * ) Notice: Subject to any disclaimer, the term of this patent is extended or adjusted under 35 U.S.C. 154(b) by 1192 days.

(21) Appl. No.: 11/329,854

(22) Filed: Jan. 11, 2006

Related U.S. Application Data (60) Provisional application No. 60/691,042, filed on Jun. 16, 2005, provisional application No. 60/682,878, filed on May 20, 2005.

(51) Int. Cl.
*H04L 9/12* (2006.01)
(52) U.S. Cl. .......................................... 726/11; 713/153
(58) Field of Classification Search .................. 726/11
See application file for complete search history.

(56) References Cited

U.S. PATENT DOCUMENTS

| | | | |
|---|---|---|---|
| 7,409,704 B1 * | 8/2008 | Charas | 726/2 |
| 2004/0255156 A1 * | 12/2004 | Chan et al. | 713/201 |
| 2005/0268331 A1 * | 12/2005 | Le et al. | 726/11 |
| 2007/0124797 A1 * | 5/2007 | Gupta et al. | 726/1 |
| 2009/0135837 A1 * | 5/2009 | Mohaban | 370/400 |

OTHER PUBLICATIONS

Wu et al.,"The Sharing Session Key Component (SSKC) Algorithm for End-to-End Secure Wireless Communication", 2000, IEEE, pp. 242-250.*

* cited by examiner

*Primary Examiner*—Matthew B Smithers
(74) *Attorney, Agent, or Firm*—Anderson Gorecki & Manaras LLP (57) ABSTRACT

End-to-end security is established automatically for network communications. In one embodiment a first host is associated with a policy manager that determines, for the first host, whether a secure session is permissible. If the secure session is determined to be permissible then the policy manager signals to intermediate devices in order to prompt establishment of SA/DA pinholes. In an alternative embodiment a neutral policy broker determines, for both first and second hosts, whether the secure session is permissible and signals to the intermediate devices to establish the pinholes if the secure session is permissible. In another embodiment the end-to-end session includes back-to-back tunnel mode sessions linked by at least one intermediate device. The intermediate device is operative to decrypt and re-encrypt traffic in the session, and may be configured by a policy manager or policy broker. Further, another security association can be nested in one or more segments of the session in a manner that permits one host to access a third host or secure resource which is shielded from the second host.

20 Claims, 7 Drawing Sheets

END-TO-END IP SECURITY

CROSS-REFERENCE TO RELATED APPLICATIONS

A claim of priority is made to the following U.S. provisional patent application Ser. No. 60/691,042, titled END TO END SECURITY, filed Jun. 16, 2005, and Ser. No. 60/682,878, titled END TO END SECURITY, filed May 20, 2005, both of which are incorporated by reference.

FIELD OF THE INVENTION

This invention relates generally to the field of network communications, and more particularly to network security.

BACKGROUND OF THE INVENTION

The need for secure communications is well known. However, techniques for providing secure communications are constantly being developed in conjunction with advances in communications technology. Security can be achieved in Internet Protocol ("IP") networks with encryption protocols such as IPSec, SIP TLS and SRTP. The security provided by these encryption protocols is generally more complete when implemented end-to-end, i.e., from host to host. However, intermediate network devices such as firewalls operate by examining packets to detect and filter communications which are hostile, unauthorized, or otherwise undesirable. This presents a problem because it is impractical for the intermediate devices to examine encrypted packets. It is known to manually configure pinholes in the intermediate network devices to allow encrypted packets to traverse the devices without being decrypted, but manual configuration is relatively slow and prone to error. There is therefore a need for a better solution to the problem. Further, there is now more urgency for a suitable solution because the IPv6 standard requires support for IPSec and allows for transport mode usage for end to end encryption. Moreover, many applications including multimedia communications have introduced their own signaling and media encryption (such as SRTP, SIP-TLS) which will also pose a problem for intermediate devices tasked with interrogating the payload and applying policies to the content.

SUMMARY OF THE INVENTION

In accordance with one embodiment of the invention, apparatus for facilitating secure network communications between a first host in a first network and a second host in a second network, where a first policy enforcement point can disallow communications from the first host to the second host and an intermediate network device is logically interposed between the first policy enforcement point and the second host, comprises: a first policy manager in the first network comprising: a security policy database operable to store data indicative of security policy applicable to the first host; policy management logic operable in response to a request to establish a secure session between the first host and second host to determine based on data in the security policy database whether to allow the request; and communication logic operable, if the request is determined to be allowed by the policy management logic, to signal to the intermediate network device in order to prompt automated establishment of a security pinhole for use by communications between the first host and the second host.

In accordance with another embodiment of the invention, apparatus for facilitating secure network communications between a first host in a first network and a second host in a second network, where a first policy enforcement point can disallow communications from the first host to the second host, a second policy enforcement point can disallow communications from the second host to the first host, and an intermediate network device is logically interposed between the first and second policy enforcement points, comprises: a neutral policy broker in communication with both the first and second networks, but not logically disposed in either the first or second network, comprising: a master security policy database operable to store data indicative of security policy applicable to the first and second hosts; policy management logic operable in response to a request to establish a secure session between the first host and second host to determine based on data in the security policy database whether to allow the request; and communication logic operable, if the request is determined to be allowed by the policy management logic, to signal to the intermediate network device in order to prompt automated establishment of a security pinhole for use by communications between the first host and the second host.

In accordance with another embodiment of the invention, apparatus for facilitating secure network communications between a first host in a first network and a second host in a second network, where a first policy enforcement point can disallow communications from the first host to the second host, a second policy enforcement point can disallow communications from the second host to the first host, and an intermediate network device is logically interposed between the first and second policy enforcement points, comprises: a neutral policy broker in communication with both the first and second networks, but not logically disposed in either the first or second network, comprising: a master security policy database operable to store data indicative of security policy applicable to the first and second hosts; policy management logic operable in response to a request to establish a secure session between the first host and second host to determine based on data in the security policy database whether to allow the request; and communication logic operable, if the request is determined to be allowed by the policy management logic, to signal to the intermediate network device in order to prompt automated establishment of a first encrypted tunnel mode session between the first host and the intermediate network device, and also to prompt automated establishment of a second encrypted tunnel mode session between the intermediate network device and the second host, thereby providing back-to-back encrypted tunnel mode sessions for which decryption and re-encryption is executed by the intermediate network device. Further, in response to a request from the first host to prompt establishment of a security association between the first host and a third host, a nested security association is established in the first encrypted tunnel such that it is shielded from access by the second host.

DETAILED DESCRIPTION

Figure 1:
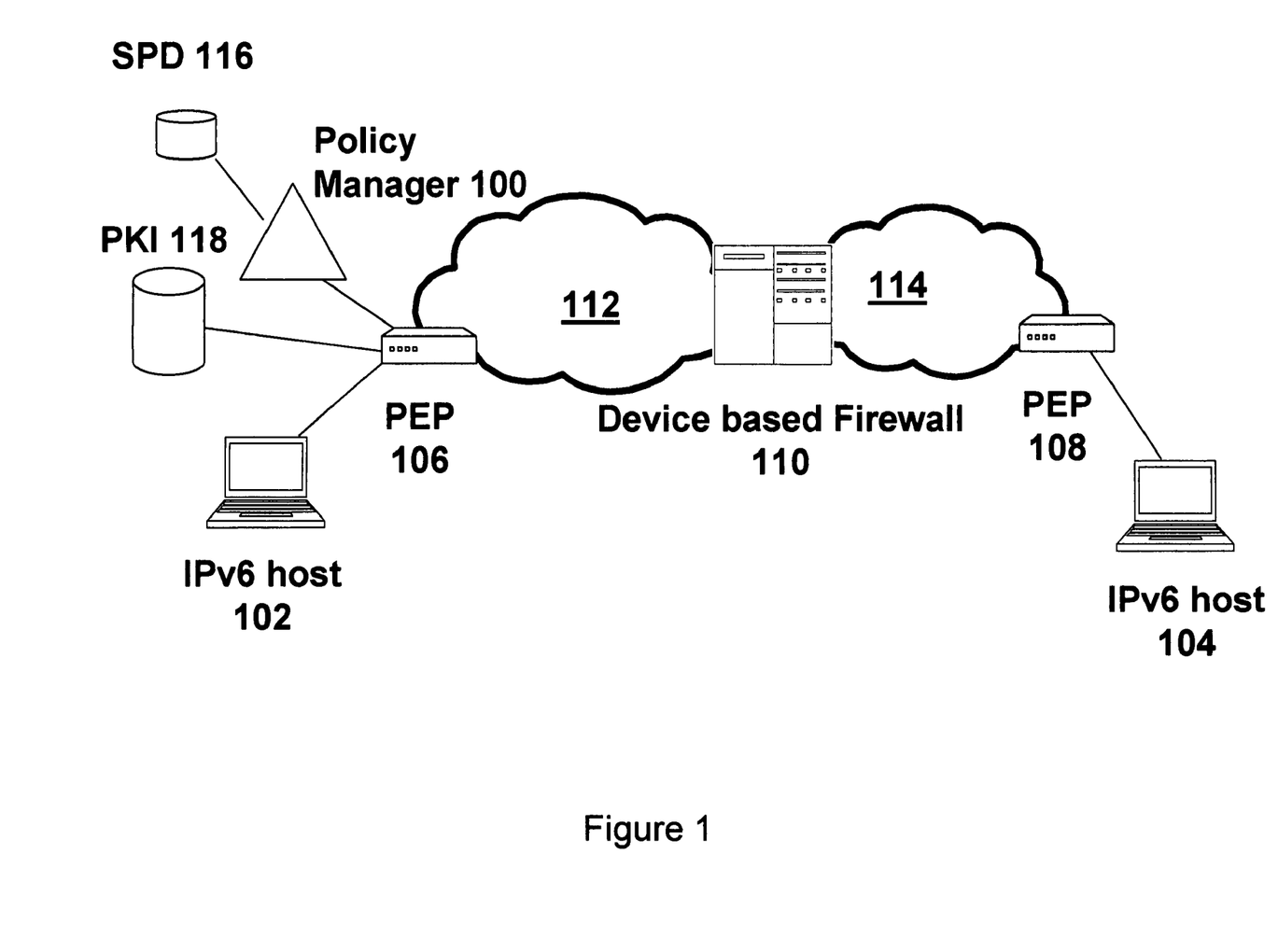
FIG. 1 is a network diagram illustrates automation of pinhole formation with a policy manager.
Figure 2:
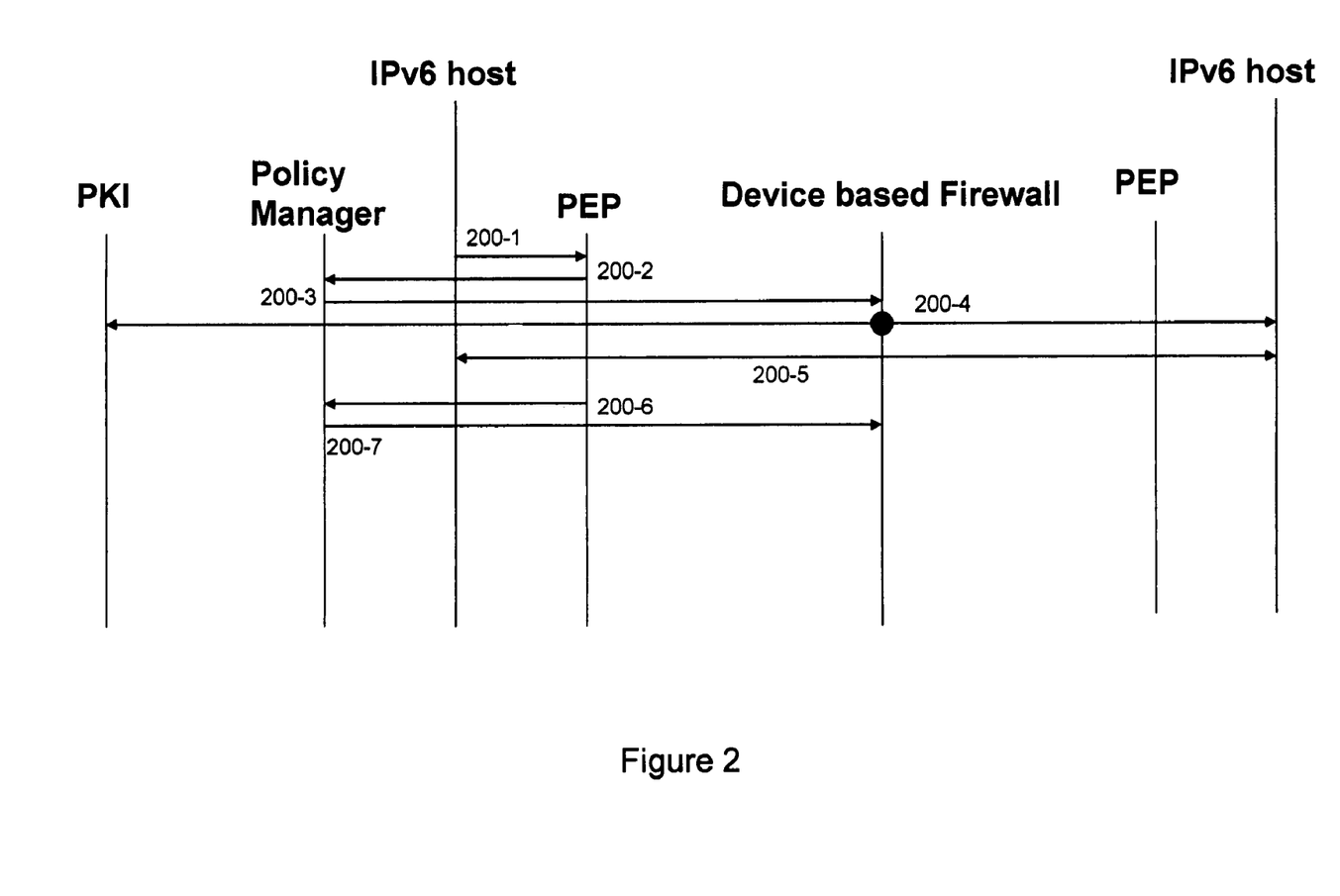
FIG. 2 is a flow diagram illustrating pinhole formation in the network of FIG. 1.

Referring to FIGS. 1 and 2, a policy manager (100) is employed to facilitate end-to-end secure communications between hosts (102, 104) via a communications network including policy enforcement points ("PEPs") (106, 108), an intermediate firewall (110), and network segments (112, 114) such as Local Area Networks ("LANs") and the internet. The PEPs (106, 108) may be gateways, switches, routers switched firewalls or other network equipment. The policy manager (100) may be implemented in a server or other network device, and need not necessarily be a stand-alone device as illustrated.

The policy manager (100) functions to control establishment of secure sessions. In an initial step (200-1) the IP host sends a request for an end-to-end encrypted session to another host. The request is intercepted at the PEP by the use of deep packet inspection. In response, the PEP sends a request to the policy manager to determine if the requested encrypted session is to be allowed, as indicated by step (200-2). The policy manager may base the decision on the identities of the hosts, the networks traversed by communications between the hosts, and other factors indicated in the request from the PEP. Further, information utilized for processing requests and configuring sessions may be stored for the policy manger in a Security Policy Database ("SPD") (116). If the request is allowed, the policy manager notifies the intermediate firewall that the requested encrypted session is authorized, as indicated by step (200-3). In response, the intermediate firewall dynamically and automatically opens the necessary Source Address/Destination Address ("SA/DA") pinhole for the encrypted session, optionally utilizing the Public Key Infrastructure (118) to enhance the trust model, as indicated by step (200-4). A Security Association ("SA") negotiation process is then executed, and the end-to-end encrypted session is established, as indicated by step (200-5). Periodic refreshes are made to the firewall in order to maintain the SA/DA pinhole as indicated in step (200-6). Upon termination of the IPSEC session the policy manager signals to the firewall to prompt removal of the pinhole as indicated in step (200-7).

Figure 3:
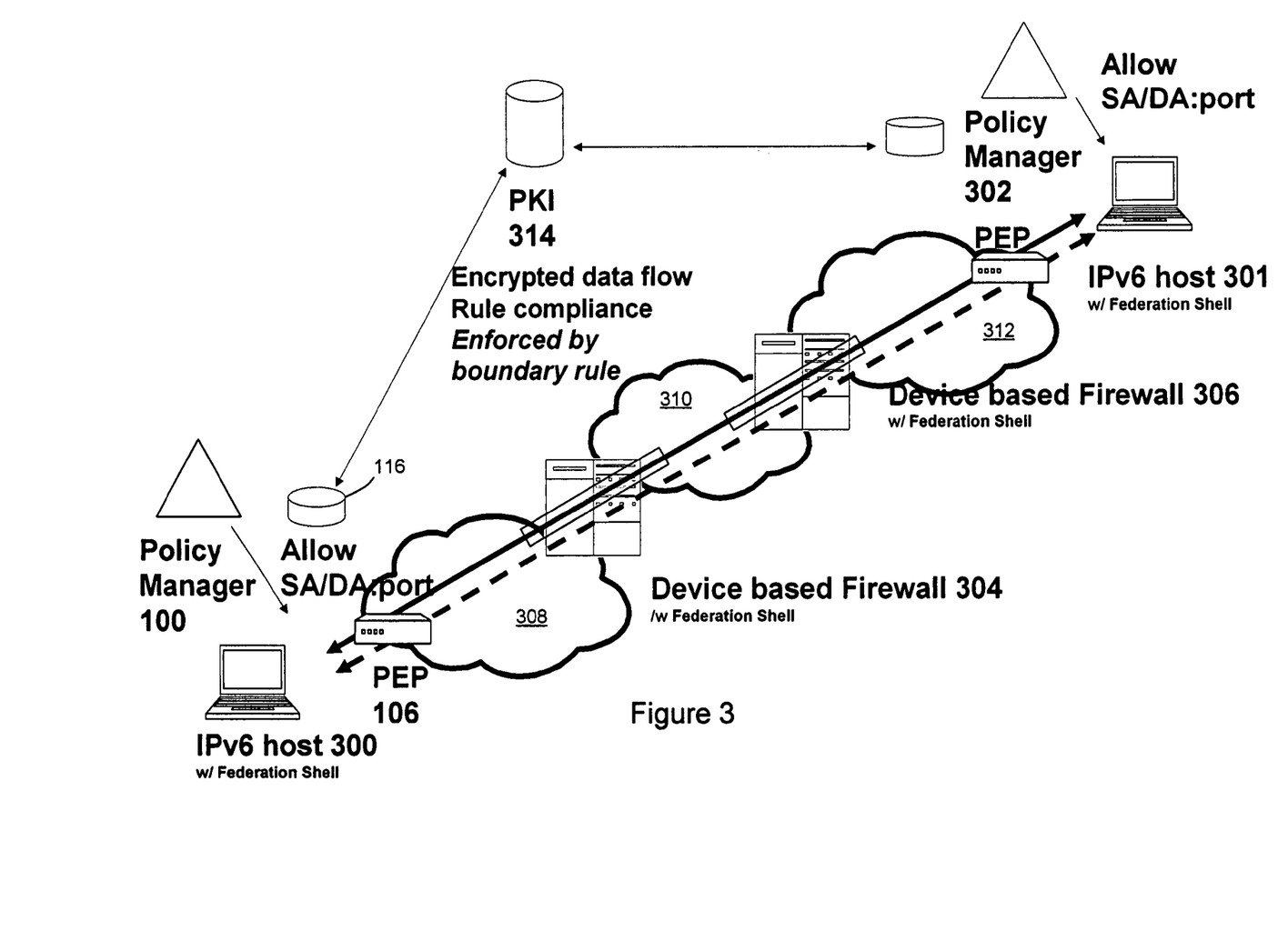
FIG. 3 illustrates an embodiment with corresponding policy managers.

Referring now to FIG. 3, in some circumstances a host (300) may need to establish a session with a host (301) which is governed by different policy manager (302). For example, the hosts might be associated with different organizations, each of which employs its own security policy via a respective policy manager, thereby defining security policy domains. Further, the path between the hosts may include multiple device-based firewalls (304, 306) and networks (308, 310, 312). In order to provide secure communications each organization is provided access to a common authorized public key infrastructure ("PKI") (314). The respective policy domains generate and utilize SAML tokens to exchange between federated IDM (Identity Management) domains via established methods, e.g., Liberty alliance. Further, each organization maintains their respective security policy without any need for common agreement other than on which users are enabled for end to end encrypted session support.

Figure 4:
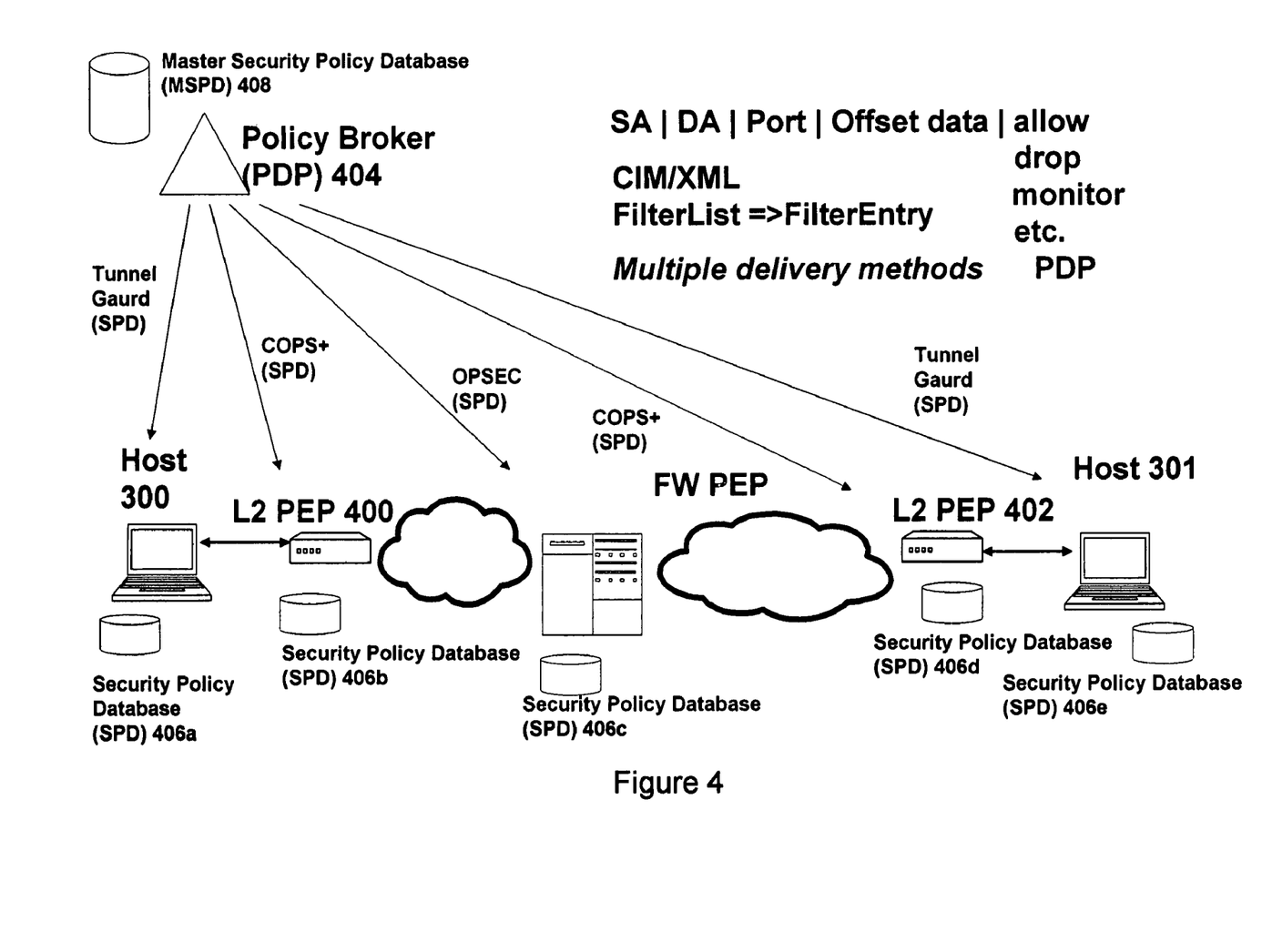
FIG. 4 illustrates an embodiment with a third-party policy broker.

Referring now to FIG. 4, in an alternative embodiment a common policy brokered environment is created where the PEP or PEPs (400, 402) refer to a neutral, $3^{rd}$ party policy broker (404) to validate that a request for a transport mode session is made from an authorized node within a Security Policy Database (406a-406e). In particular, the policy broker (404) employs a Master Security Policy Database (MSPD) (408) to evaluate the request. Once the Policy Broker (408) approves the request it will in turn send a message, e.g., a COPS or CLI message, to the necessary intermediate devices, e.g., firewalls and TPS, in order to open up SA/DA port pair pinholes to allow end-to-end SA negotiation to occur. The intermediate devices 'trust' the SA/DA transport session by virtue of trust in the Policy Broker, and will therefore allow the encrypted traffic to traverse their boundaries.

In one example of the policy brokered technique, IPsec transport mode is used to establish end-to-end IPsec communications (although it should be noted that this would apply equally well to any transport level session based encrypted session). To start the process the initiating IPsec host (300) sends out a request for a transport mode IPsec session based on a specific port call which passes criteria in the host's SPD (406a). It is assumed that the PDP (404) has previously defined these parameters via dialog with a security federation shell that would be assumed to be resident in the device. Requests that come from hosts that do not support the security federation shell can either be ignored and blocked or proxied by the use of an edge switch PEP. Once the PDP authorizes the end-to-end session by one of the previously described methods, it ports-out modifications to the intermediate device SPDs (406b through 406d) to allow for the SA/DA pair to negotiate an end-to-end security association. The SPDs of these intermediate devices would be periodically refreshed as long as the session is active. At the time that the session is terminated either the host (300) or the edge switch PEP (400), and preferably both in order to prevent spoofing of the system by the host, notify the PDP (404) which, in response, ports-out changes to the intermediate device SPDs to close the SA/DA pinholes. Hence, secure, trusted end-to-end IPsec transport mode communications can occur within the context of a policy brokered environment.

Further enhancements can be made to this model by leveraging a Security Policy Database (SPD) that resides in each IP host (300, 301). For example, the SPDs (406a, 406e) could be modified, controlled, or both modified and controlled by the use of a 'policy shim' hereafter termed as a 'Federation Shell' that would allow for the manipulation of allowable port calls within the SPD for transport level session based encrypted communications of any type. Any port call and destination address that is found in the host's SPD will be allowed encrypted transport services. Any port call which does not match in the SPD is sent in the clear. The result is a secure concept of federated trust where pinholes are created dynamically against the policy brokered environment in any intermediate security devices thereby allowing for secure yet dynamic end-to-end IPsec communications and other encryption methods.

Figure 5:
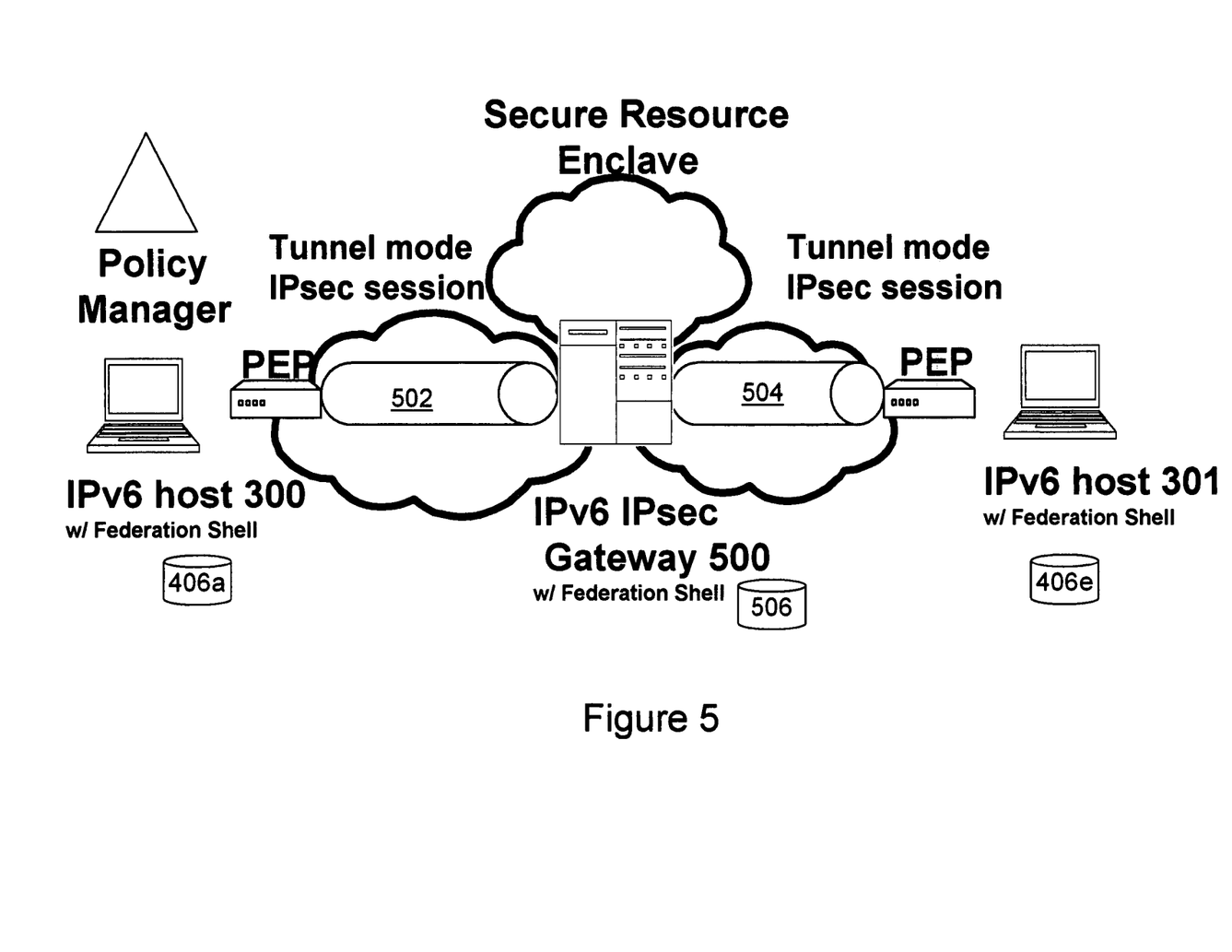
FIG. 5 illustrates tunnel relay.

Referring to FIG. 5, an alternative embodiment may be employed in larger networks or for general public usage via the Internet. The alternative embodiment employs active participation of at least one IPsec security gateway (500), e.g., a VPN router. In particular, rather than supporting mesh host based transport SAs, end-to-end encryption is accomplished by the establishment of back-to-back encrypted tunnel mode sessions (502, 504) that are established by the intermediate gateway (500) at the request of an end host (300) supporting the encryption protocol. For example, if host (300) requests a secure communication session with host (301) then a first tunnel (502) is negotiated between host (300) and the intermediate gateway (500), and once that is established, a second tunnel (504) is negotiated between the intermediate gateway and host (301). There are therefore two security associations; one for each tunnel. The intermediate gateway includes a table or database, e.g., an SA table, which links traffic from host (300) to host (301). By this process an end-to-end secure session can be established with an active entity in the middle which has access to unencrypted information. This technique enhances scalability because the SPD (506) of the intermediate gateway can be leveraged, thereby allowing for the condensation of SA management practice. Additionally, such a technique may be useful where intermediate access to unencrypted data is required.

Figure 6:
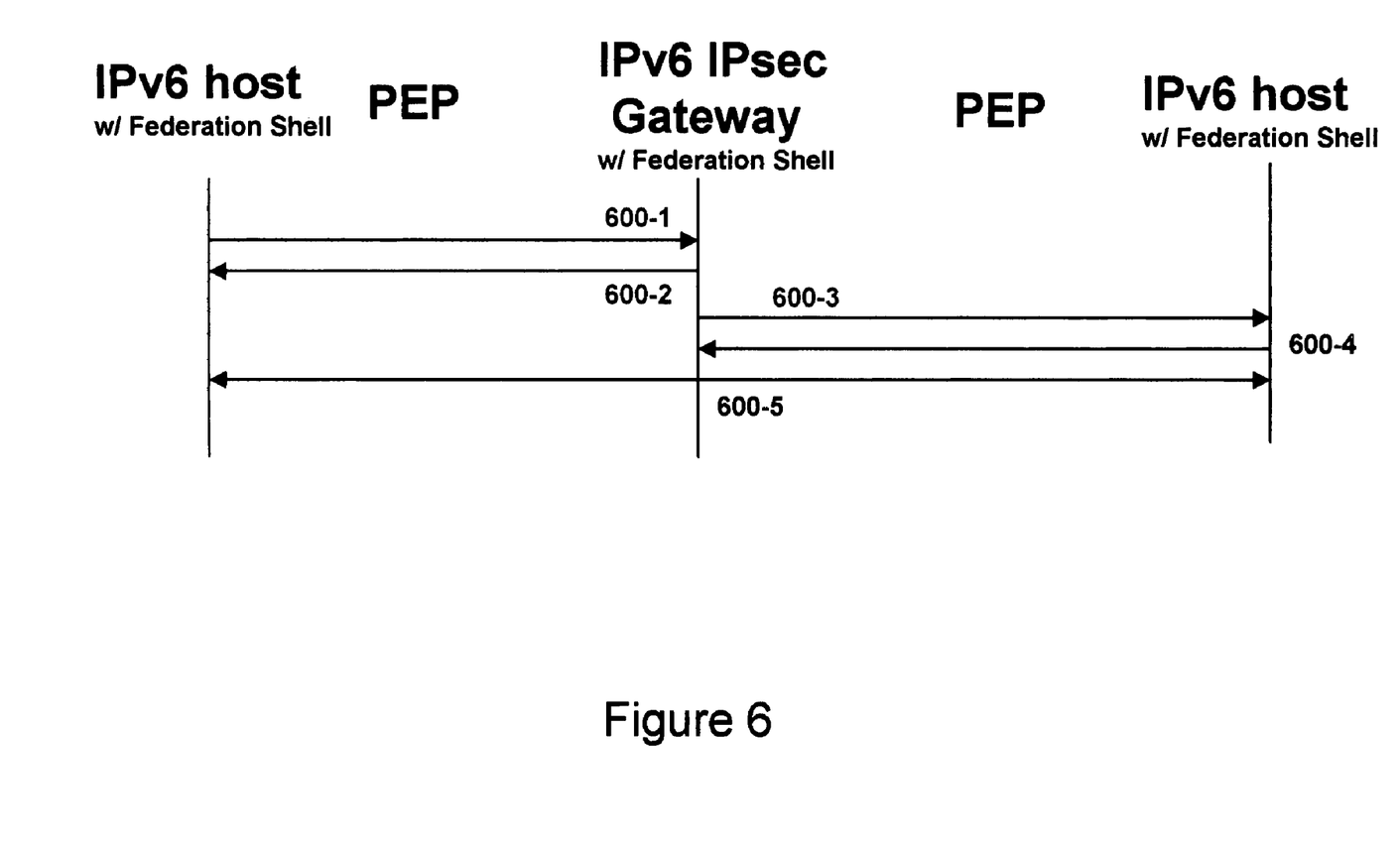
FIG. 6 is a flow diagram illustrating tunnel relay in the network of FIG. 5.

Referring to FIGS. 5 and 6, in a specific example of the back-to-back tunnel technique, IPsec tunnel mode is used to establish end-to-end IPsec communications. To start the process the initiating IPsec host sends out a request for a tunnel mode IPsec session as indicated in step (600-1). This can be based on the host's SPD or allowed via a proxy PEP as already described above. However, rather than establishing an unbroken end-to-end tunnel with the other host (301), the initiating host (300) has a tunnel (502) established into an intermediate IPsec gateway (500). The specific gateway to which the host is directed is a matter of organization policy. Further, it may be desirable to employ tunnel 'hunt groups' that work in tandem with VPN load balancing. Once the IPsec gateway establishes the IPsec tunnel as indicated by step (600-2) it will, after checking with its SPD, solicit a tunnel session out to the second host as indicated in step (600-3). The second host's Federation Shell will in turn check its SPD (406e) and then complete the establishment of the tunnel with the intermediate IPsec gateway as indicated in step (600-4). The result is a secure end-to-end IPsec communications path as indicated by step (600-5).

Figure 7:
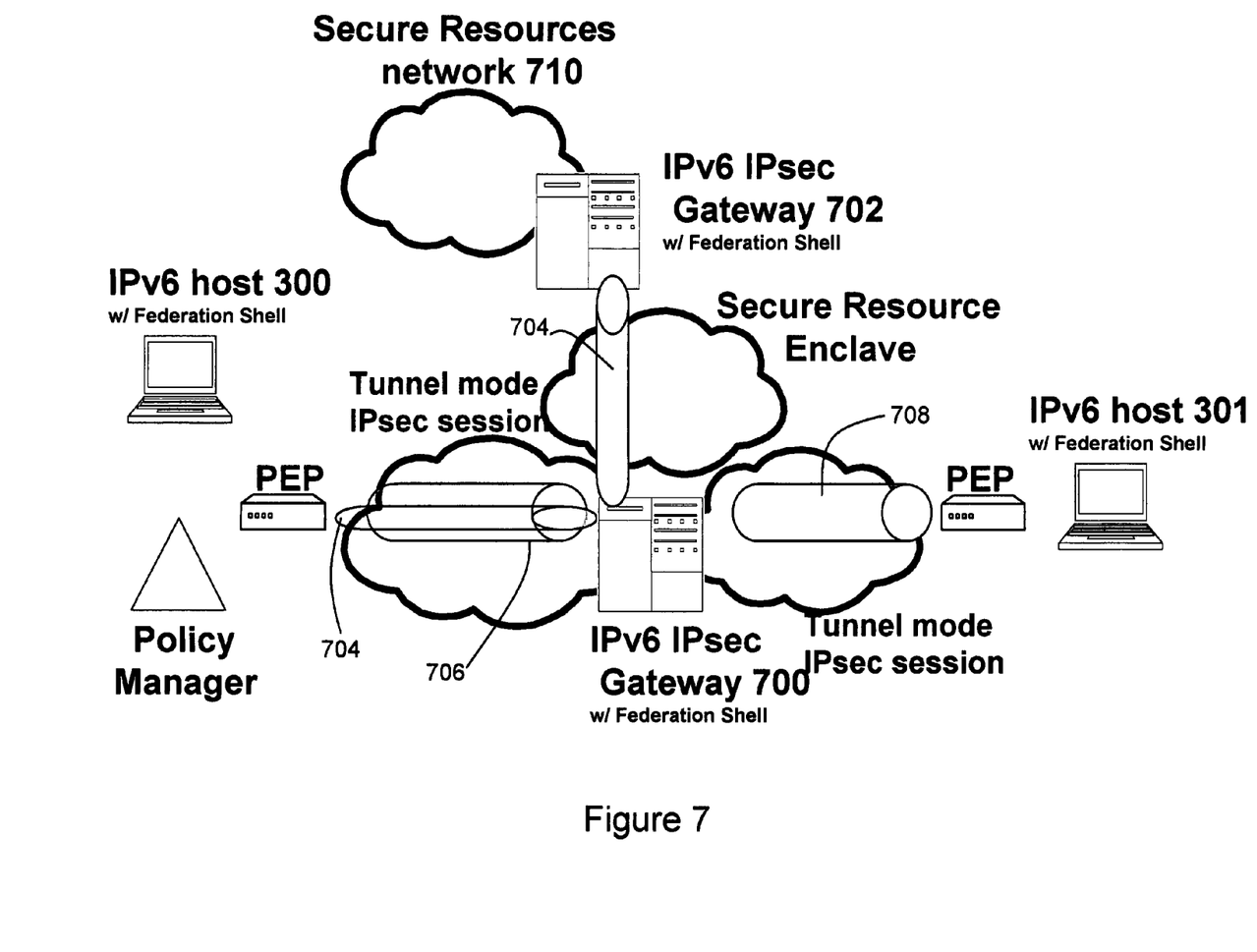
FIG. 7 illustrates security association nesting.

Referring now to FIG. 7, in another alternative embodiment the IPsec Tunnel Mode Relay technique is employed to enable SAs to be nested through multiple intermediate IPsec gateways (700, 702). This extension of the IPsec Tunnel Mode Relay technique enables tiered security models that can be different for each host (300, 301). However, it should be noted that this does not necessarily imply nested encryption. Encryption may be done once at the host and then extended via the nested SAs across the intermediate IPsec gateways. The IPsec gateways provide back-to-back tunnels (706, 708) extension. Consequently, each IPsec gateway will have access to clear traffic and be able to provide a device-based firewall role that in turn is 'federated' into the single policy brokered environment. Further, one of the participating hosts may choose to 'nest' another SA (704) within one of the back-to-back IPsec tunnel sessions (706). The first intermediate IPsec gateway (700) can extend the nested IPsec tunnel SA (704) to the secondary IPsec gateway (702) or another IPsec host (not illustrated). This secondary SA will be nested into the first, although only a single encryption will be used from the host (300) to the first IPsec gateway (700). The second tunnel (704) between the first and second IPsec gateway (or end host) however uses the nested SA for encryption. As a consequence, each participating IPsec host could have different nested SAs, each secure from one another and each dictated according to the global policies of the policy broker. Another tangible benefit to Tunnel Mode Relay is that it can work in an IPv4 environment as well as IPv6 by a retrofit to existing VPN client software.

In a specific example of Tunnel Mode Relay, host (300) has a secure session with host (301), but also needs to access files that are located at a node in network (710), but without host (301) being able to access those files. Since hosts (300, 301) are connected by an intermediate gateway (700), that intermediate gateway negotiates a secure tunnel with the node in network (710) to which only host (300) has access. The SA can be nested in the first tunnel (706), or alternatively there can be double encryption over the first tunnel. Ideally, the system should provide the ability to monitor the deployment status of the network sessions and tunnels as well as modify any particular policies associated with the network. This should occur by federation with existing systems that are capable of providing this role.

It should be noted that the techniques described above are not mutually exclusive. Indeed, under some circumstances it may be desirable to implement the techniques in a single network, perhaps contemporaneously. Hence, the techniques together allow for single policy brokered security environment that could potentially accommodate all modes of IPsec and other encryption (i.e. TLS/SRTP) methods. It should also be noted that the above description uses IPSec by way of example only. The invention is equally applicable to other encryption models, including but not limited to SSL, SIP TLS and SRTP in both IPv6 and IPv4 environments.

While the invention is described through the above exemplary embodiments, it will be understood by those of ordinary skill in the art that modification to and variation of the illustrated embodiments may be made without departing from the inventive concepts herein disclosed. Moreover, while the preferred embodiments are described in connection with various illustrative structures, one skilled in the art will recognize that the system may be embodied using a variety of specific structures. Accordingly, the invention should not be viewed as limited except by the scope and spirit of the appended claims.

What is claimed is:

1. Apparatus for facilitating secure network communications between a first host in a first network and a second host in a second network, where a first policy enforcement point can disallow communications from the first host to the second host and an intermediate network device is logically interposed between the first policy enforcement point and the second host, comprising:
 a first policy manager in the first network which is a physical device independent of the first and second hosts comprising:
  physical storage including a security policy database operable to store data indicative of security policy applicable to the first host;
  policy management logic operable in response to a request to establish a secure session between the first host and second host to determine based on data in the security policy database whether to allow the request; and
  communication logic operable, if the request is determined to be allowed by the policy management logic, to signal to the intermediate network device in order to prompt automated establishment of a security pinhole for use by communications between the first host and the second host.

2. The apparatus of claim 1 wherein the secure session is a transport level session based encryption method, and the security pinhole is a source address/destination address ("SA/DA") pinhole.

3. The apparatus of claim 1 wherein the communication logic is further operable to periodically signal to the intermediate network device in order to maintain the security pinhole.

4. The apparatus of claim 1 further including a second policy manager in the second network and second policy enforcement point for the second host.

5. The apparatus of claim 4 further including the option of providing for a common public key infrastructure ("PKI") accessible by both the first and second policy mangers.

6. Apparatus for facilitating secure network communications between a first host in a first network and a second host in a second network, where a first policy enforcement point can disallow communications from the first host to the second host, a second policy enforcement point can disallow communications from the second host to the first host, and an intermediate network device is logically interposed between the first and second policy enforcement points, comprising:

a neutral policy broker, which is a physical device, in communication with both the first and second networks, but not logically disposed in either the first or second network, comprising:

physical storage including a master security policy database operable to store data indicative of security policy applicable to the first and second hosts;

policy management logic operable in response to a request to establish a secure session between the first host and second host to determine based on data in the security policy database whether to allow the request; and communication logic operable, if the request is determined to be allowed by the policy management logic, to signal to the intermediate network device in order to prompt automated establishment of a security pinhole for use by communications between the first host and the second host.

7. The apparatus of claim 6 wherein the secure session is a transport level encrypted session such as IPsec transport mode, and the security pinhole is a source address/destination address ("SA/DA") pinhole.

8. The apparatus of claim 6 wherein the communication logic is further operable to periodically signal to the intermediate network device in order to maintain the security pinhole.

9. Apparatus for facilitating secure network communications between a first host in a first network and a second host in a second network, where a first policy enforcement point can disallow communications from the first host to the second host, a second policy enforcement point can disallow communications from the second host to the first host, and an intermediate network device is logically interposed between the first and second policy enforcement points, comprising:

a neutral policy broker, which is a physical device, in communication with both the first and second networks, but not logically disposed in either the first or second network, comprising:

physical storage including a master security policy database operable to store data indicative of security policy applicable to the first and second hosts;

policy management logic operable in response to a request to establish a secure session between the first host and second host to determine based on data in the security policy database whether to allow the request; and communication logic operable, if the request is determined to be allowed by the policy management logic, to signal to the intermediate network device in order to prompt automated establishment of a first encrypted tunnel mode session between the first host and the intermediate network device, and also to prompt automated establishment of a second encrypted tunnel mode session between the intermediate network device and the second host, thereby providing back-to-back encrypted tunnel mode sessions for which decryption and re-encryption is executed by the intermediate network device.

10. The apparatus of claim 9 further including logic operable in response to a request from the first host to prompt establishment of a security association between the first host and a third host, the security association being nested in the first encrypted tunnel and also being shielded from access by the second host.

11. A method for facilitating secure network communications between a first host in a first network and a second host in a second network, where a first policy enforcement point can disallow communications from the first host to the second host and an intermediate network device is logically interposed between the first policy enforcement point and the second host, comprising the steps of:

in a first policy manager which is a physical device independent of the first and second hosts in the first network, storing, in a security policy database in physical storage, data indicative of security policy applicable to the first host;

determining, with policy management logic operable in response to a request to establish a secure session between the first host and second host, whether to allow the request based on data in the security policy database; and signaling, with communication logic if the request is determined to be allowed by the policy management logic, to the intermediate network device in order to prompt automated establishment of a security pinhole for use by communications between the first host and the second host.

12. The method of claim 11 wherein the secure session is a transport level session based encryption method, and the security pinhole is a source address/destination address ("SA/DA") pinhole.

13. The method of claim 11 further including the step of periodically signaling with the communication logic to the intermediate network device in order to maintain the security pinhole.

14. The method of claim 11 further including a second policy manager in the second network and second policy enforcement point for the second host.

15. The method of claim 14 further including the option of providing for a common public key infrastructure ("PKI") accessible by both the first and second policy mangers.

16. A method for facilitating a secure network communications between a first host in a first network and a second host in a second network, where a first policy enforcement point can disallow communications from the first host to the second host, a second policy enforcement point can disallow communications from the second host to the first host, and an intermediate network device is logically interposed between the first and second policy enforcement points, comprising the steps of:

with a neutral policy broker, which is a physical device, in communication with both the first and second networks, but not logically disposed in either the first or second network, storing data indicative of security policy applicable to the first and second hosts in a master security policy database in physical storage;

determining whether to allow the request, with policy management logic operable in response to a request to establish a secure session between the first host and second host, based on data in the security policy database; and signaling, with communication logic operable if the request is determined to be allowed by the policy management logic, to the intermediate network device in order to prompt automated establishment of a security pinhole for use by communications between the first host and the second host.

17. The method of claim 16 wherein the secure session is a transport level encrypted session such as IPsec transport mode, and the security pinhole is a source address/destination address ("SA/DA") pinhole.

18. The method of claim 16 including the further step of periodically signaling with the communication logic to the intermediate network device in order to maintain the security pinhole.

19. A method for facilitating secure network communications between a first host in a first network and a second host in a second network, where a first policy enforcement point can disallow communications from the first host to the second host, a second policy enforcement point can disallow communications from the second host to the first host, and an intermediate network device is logically interposed between the first and second policy enforcement points, comprising the steps of:

with a neutral policy broker, which is a physical device, in communication with both the first and second networks, but not logically disposed in either the first or second network, storing data indicative of security policy applicable to the first and second hosts in a master security policy database in physical storage;

determining, with policy management logic operable in response to a request to establish a secure session between the first host and second host, based on data in the security policy database whether to allow the request; and signaling, with communication logic operable if the request is determined to be allowed by the policy management logic, to the intermediate network device in order to prompt automated establishment of a first encrypted tunnel mode session between the first host and the intermediate network device, and also to prompt automated establishment of a second encrypted tunnel mode session between the intermediate network device and the second host, thereby providing back-to-back encrypted tunnel mode sessions for which decryption and re-encryption is executed by the intermediate network device.

20. The method of claim 19 further including the step of prompting establishment of a security association between the first host and the third host with logic operable in response to a request from the first host, the security association being nested in the first encrypted tunnel and also being shielded from access by the second host.

* * * * *